(12) United States Patent
Gambino

(10) Patent No.: US 11,772,146 B2
(45) Date of Patent: Oct. 3, 2023

(54) TUBE PROCESSING SYSTEMS

(71) Applicant: Joseph Gambino, Sandy, OR (US)

(72) Inventor: Joseph Gambino, Sandy, OR (US)

(73) Assignee: Rogue Fabrication, LLC, Sandy, OR (US)

( * ) Notice: Subject to any disclaimer, the term of this patent is extended or adjusted under 35 U.S.C. 154(b) by 0 days.

(21) Appl. No.: 17/855,511

(22) Filed: Jun. 30, 2022

(65) Prior Publication Data

US 2023/0001465 A1 Jan. 5, 2023

Related U.S. Application Data

(60) Provisional application No. 63/217,641, filed on Jul. 1, 2021.

(51) Int. Cl.
*B21D 7/06* (2006.01)
*B21D 28/28* (2006.01)

(52) U.S. Cl.
CPC ............... *B21D 7/06* (2013.01); *B21D 28/28* (2013.01)

(58) Field of Classification Search
CPC . B21D 7/02; B21D 7/06; B21D 7/085; B21D 7/16; B21D 28/28; B21D 43/003
See application file for complete search history.

(56) References Cited

U.S. PATENT DOCUMENTS

| | | | | |
|---|---|---|---|---|
| 4,779,436 A | * | 10/1988 | Schwarze | B23K 26/0838 72/149 |
| 2018/0250778 A1 | * | 9/2018 | Fumagalli | B23K 37/053 |
| 2020/0398391 A1 | * | 12/2020 | Wang | B21D 43/006 |

* cited by examiner

*Primary Examiner* — Teresa M Ekiert
(74) *Attorney, Agent, or Firm* — Mohr IP Law Solutions, PC

(57) ABSTRACT

Tube processing systems for bending and notching a tube fed from a feed position. The tube processing system includes a notching system and a bending system. The notching system is configured to cut a notch in the tube. The bending system is disposed between the notching system and the feed position and is configured to bend the tube. The notching system includes a cutting head and a positioning system. The cutting head is configured to cut a notch in the tube. The positioning system movably supports the cutting head and is configured to move the cutting head relative to the tube to a selected cutting position. The bending system includes a bending die and a clamp. The bending die is rotationally driven to bend the tube. The clamp is configured to secure the tube to the bending die.

17 Claims, 18 Drawing Sheets

TUBE PROCESSING SYSTEMS

CROSS REFERENCE TO RELATED APPLICATIONS

This application claims priority to U.S. Application, Ser. No. 63/217,641, filed on Jul. 1, 2021, which is hereby incorporated by reference for all purposes.

BACKGROUND

The present disclosure relates generally to workpiece processing systems. In particular, tube processing systems are described.

Tubes or pipes (hereinafter simply tubes) are a common type of workpiece that are often used for transferring fluids, either liquid or gas, from one location to another. Tubes can have structural purposes in addition or alternatively to transferring fluids, such as in conduit, roll cage, and handrail applications. This document will focus on tubular workpieces.

Bending tubes is also useful for many different applications. Bending a tube is often necessary to conform the tube to a specified shape for a given end product, such as a coil, a curved exhaust pipe, or a U-shaped conduit. Tube bending devices are generally used to bend tubes.

Forming notches or other cuts in tubes is useful for a variety of purposes and applications. For example, forming notches in a tube can enable coping round tubes or pipes together. Coping tubes together is useful to build various items, including roll cages, handrails, furniture, and gates. Tube notching devices are often employed to form notches in tubes.

Conventionally, operators must utilize two separate devices to bend and notch a tube. Relying on separate devices to bend and notch a tube is problematic for a host of reasons.

One important drawback of needing two separate devices to bend and notch a tube is that accuracy and precision suffer. When an operator notches a tube in one machine and transfers the tube to another machine to bend, or vice-versa, he or she will often fail to align the tube accurately in the second machine to correspond perfectly with the alignment in the first machine. Aligning the tube inaccurately in the second machine results in the bend and the notch not aligning relative to each other as accurately as intended.

Another drawback of relying on multiple devices involves expense. Purchasing two separate machines to bend and notch tubes is expensive. Further, additional expense derives from maintaining both machines.

Processing speed and convenience also suffer when separate devices are needed to bend and notch a tube. When an operator must use separate devices to bend and notch a tube, time is lost when the operator must set up each machine, transfer the tube from one machine to another, and align the tube as accurately as possible in each machine. Not only is using multiple machines slower, it is less convenient for the operator.

An additional drawback of needing two separate machines is the space required for them. Processing tubes requires support for long tubes, such as standard length 20-foot tubes. Two separate machines to bend and notch tubes will each typically require supports sufficient to support 20-foot tubes or longer. Housing multiple machines with supports extending out nearly 20-feet can consume a lot of space in machine shops.

Thus, there exists a need for systems that improve upon and advance the design of known tube bending machines and tube notching machines. Examples of new and useful tube processing systems relevant to the needs existing in the field are discussed below.

Disclosure addressing one or more of the identified existing needs is provided in the detailed description below. Examples of references relevant to tube processing systems include U.S. patent application Ser. Nos. 17/028,233 and 17/105,115. The complete disclosures of these listed patent applications are herein incorporated by reference for all purposes.

SUMMARY

The present disclosure is directed to tube processing systems for bending and notching a tube fed from a feed position. The tube processing system includes a notching system and a bending system. The notching system is configured to cut a notch in the tube. The bending system is disposed between the notching system and the feed position and is configured to bend the tube. The notching system includes a cutting head and a positioning system. The cutting head is configured to cut a notch in the tube. The positioning system movably supports the cutting head and is configured to move the cutting head relative to the tube to a selected cutting position. The bending system includes a bending die and a clamp. The bending die is rotationally driven to bend the tube. The clamp is configured to secure the tube to the bending die.

DETAILED DESCRIPTION

Figure 1:
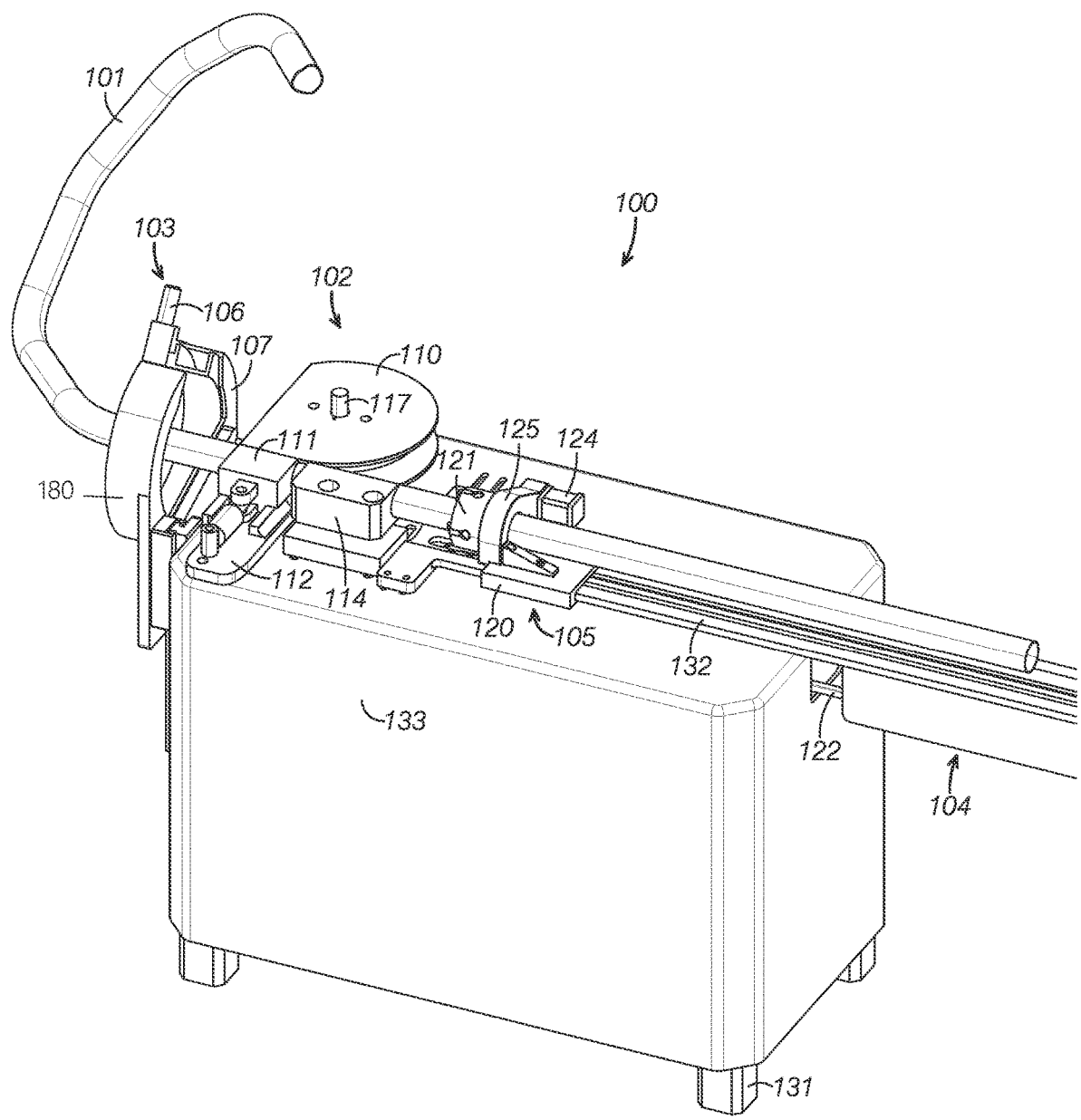
FIG. 1 is an upper, left side perspective view of a first example of a tube processing system.

The disclosed tube processing systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various tube processing systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device exchanges information with another electronic device, either wirelessly or with a wire-based connector, whether directly or indirectly through a communication network.

"Controllably coupled" means that an electronic device controls operation of another electronic device.

Tube Processing Systems

With reference to the figures, tube processing systems will now be described. The tube processing systems discussed herein function to bend tubes and to notch tubes with a single machine.

The reader will appreciate from the figures and description below that the presently disclosed tube processing systems address many of the shortcomings of conventional approaches to bending and notching tubes. For example, the novel tube processing systems described herein remove the need for operators to use two separate devices to bend and notch a tube. Combing the functions of separate tube bending devices and tube notching devices into a single system is beneficial for many reasons.

One important improvement over conventional approaches to bend and notch a tube is that the novel tube processing systems described in this document increase accuracy and precision. With the presently described novel tube processing systems, an operator does not need to align a tube multiple times on separate machines, which is prone to inaccuracy. By utilizing a single machine to bend and notch a tube, the bend and the notch may be aligned relative to each other more accurately.

The novel tube processing systems described herein are more cost effective than purchasing two separate machines to bend and notch a tube. Further, maintenance expenses are lower for the novel tube processing systems described in this document than the expenses required to maintain two separate machines.

Processing speed and convenience also improve when utilizing the novel tube processing systems herein to bend and notch a tube with a single machine. Processing time is saved because an operator does not need to set up multiple machines, transfer a tube from one machine to another, and align the tube as accurately as possible in each machine. In addition to improved processing speed, bending and notching a tube with a single machine is more convenient for the operator than having to use multiple machines.

Space savings is another benefit of the novel tube processing systems described below. With tube bending and notching functions provided by a single machine, only one support system for long tubes is needed rather than two separate support systems for separate machines. It is easier to find space in a machine shop to house a single machine with one support system extending out nearly 20-feet than it is to house two machines each having support systems extending out nearly 20-feet.

Contextual Details

Ancillary features relevant to the tube processing systems described herein will first be described to provide context and to aid the discussion of the novel tube processing systems.

Tube

Tube 101 is bent to defined parameters by the tube processing systems described below. The tube may be any currently known or later developed type of tube. The reader will appreciate that a variety of tube types exist and could be used in place of the tube shown in the figures. In addition to the types of tubes existing currently, it is contemplated that the tube processing systems described herein could be used with new types of tubes developed in the future.

The size of the tube may be varied as needed for a given application. In some examples, the tube is larger relative to the other components than depicted in the figures. In other examples, the tube is smaller relative to the other components than depicted in the figures. Further, the reader should understand that the tube and the other components may all be larger or smaller than described herein while maintaining their relative proportions.

The tube may be any of a wide variety of currently known or later developed metals and effectively bent and notched by the tube processing systems described below. Suitable tube materials include carbon steels (1010, 1020, 1026, and 4130 steel), stainless steels, aluminum (6061 and 6063 up to T6 temper), titanium in (CWSR (cold worked stress relieved) and annealed condition (2.5AL-3V, CP2, others), as well as copper and its alloys.

Tube Processing System Embodiment One

With reference to FIGS. 1-14, a first example of a tube processing system, system 100, will now be described. System 100 includes a bending system 102, a notching system 103, a support system 104, and a feed system 105. In some examples, the system does not include one or more features included in system 100. In other examples, the system includes additional or alternative features beyond those shown in FIGS. 1-14.

Bending System

Bending system 102 functions to bend tube 101 to desired bending parameters. The reader can see in FIGS. 1-16 that bending system 102 is configured to form multiple complex bends in tube 101.

In the example shown in FIGS. 1-16, bending system 102 includes a die 110, a clamp 111, a tray 112, a rotation assembly 113, a wiper die 114, and a mandrel (not pictured). The bending system may include additional or alternative components, such as lubrication systems and alignment aids. In some examples, the bending system does not include certain components of bending system 102, such as not including a mandrel or a wiper die.

As shown in FIGS. 1-4, 6, and 8-16, die 110 is mounted to support system 104 proximate to tube 101 and rotationally driven by rotation assembly 113. The reader can see in FIGS. 1-5, 7, and 12-16 that clamp 111 is mounted on tray 112 and selectively couples tube 101 to die 110. When rotation assembly 113 rotates die 110 to which tube 101 is secured by clamp 111, tube 101 is bent. The mandrel may be inserted inside tube 101 to internally support tube 101 as it is bent.

Figure 12:
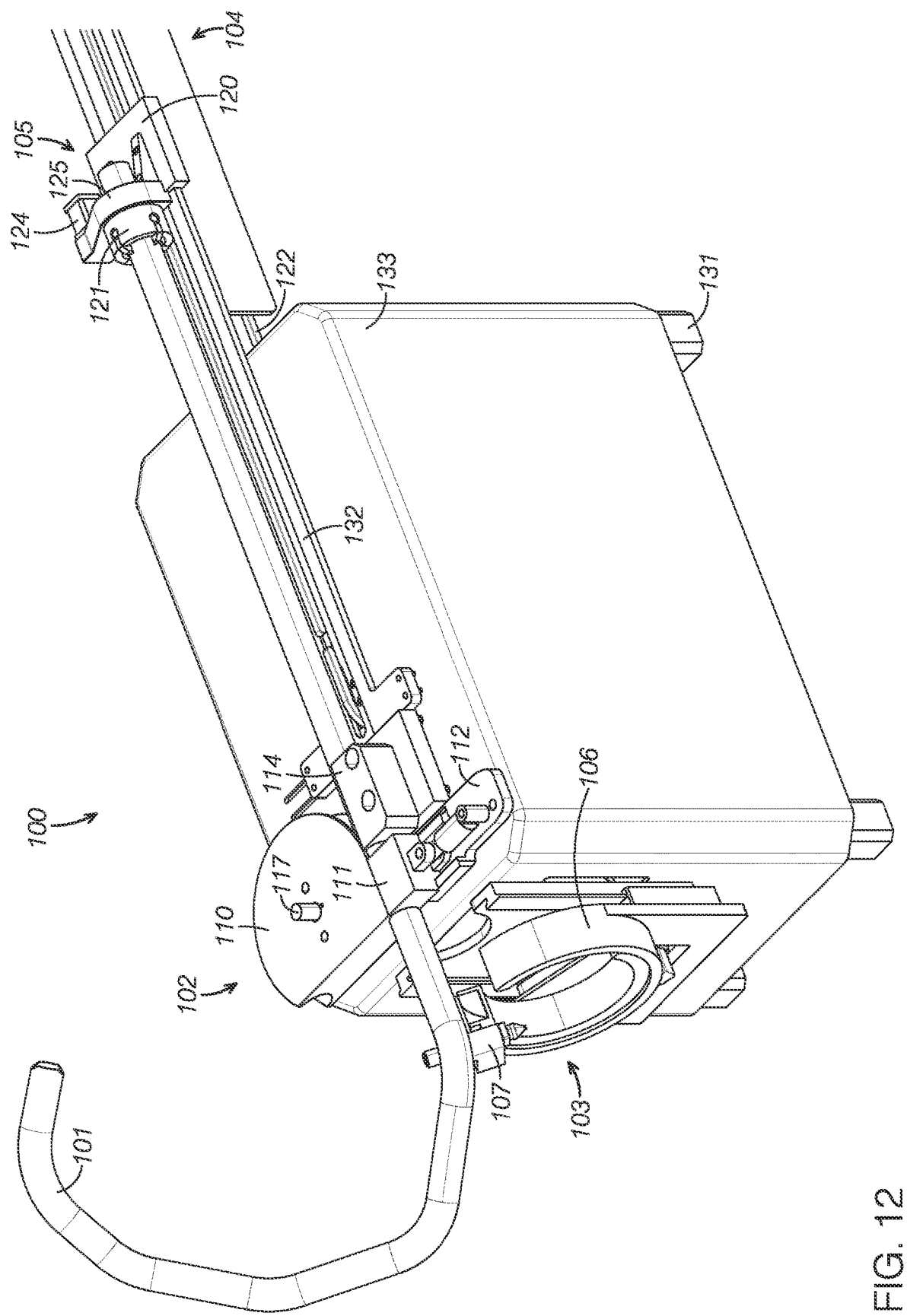
FIG. 12 is perspective view of the tube processing system shown in FIG. 1 in a first step of a processing sequence.
Figure 13:
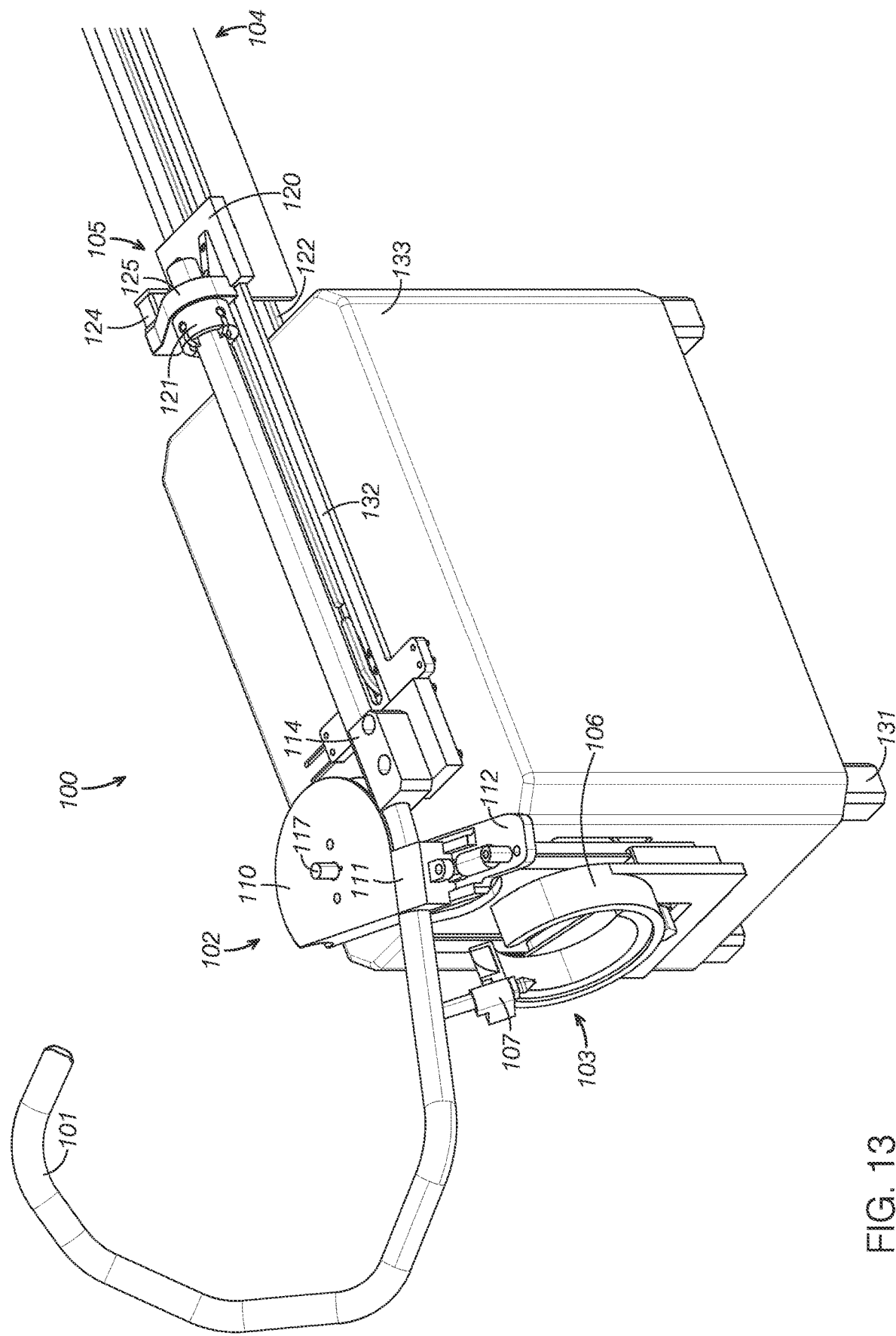
FIG. 13 is perspective view of the tube processing system shown in FIG. 1 in a second step of a processing sequence.
Figure 14:
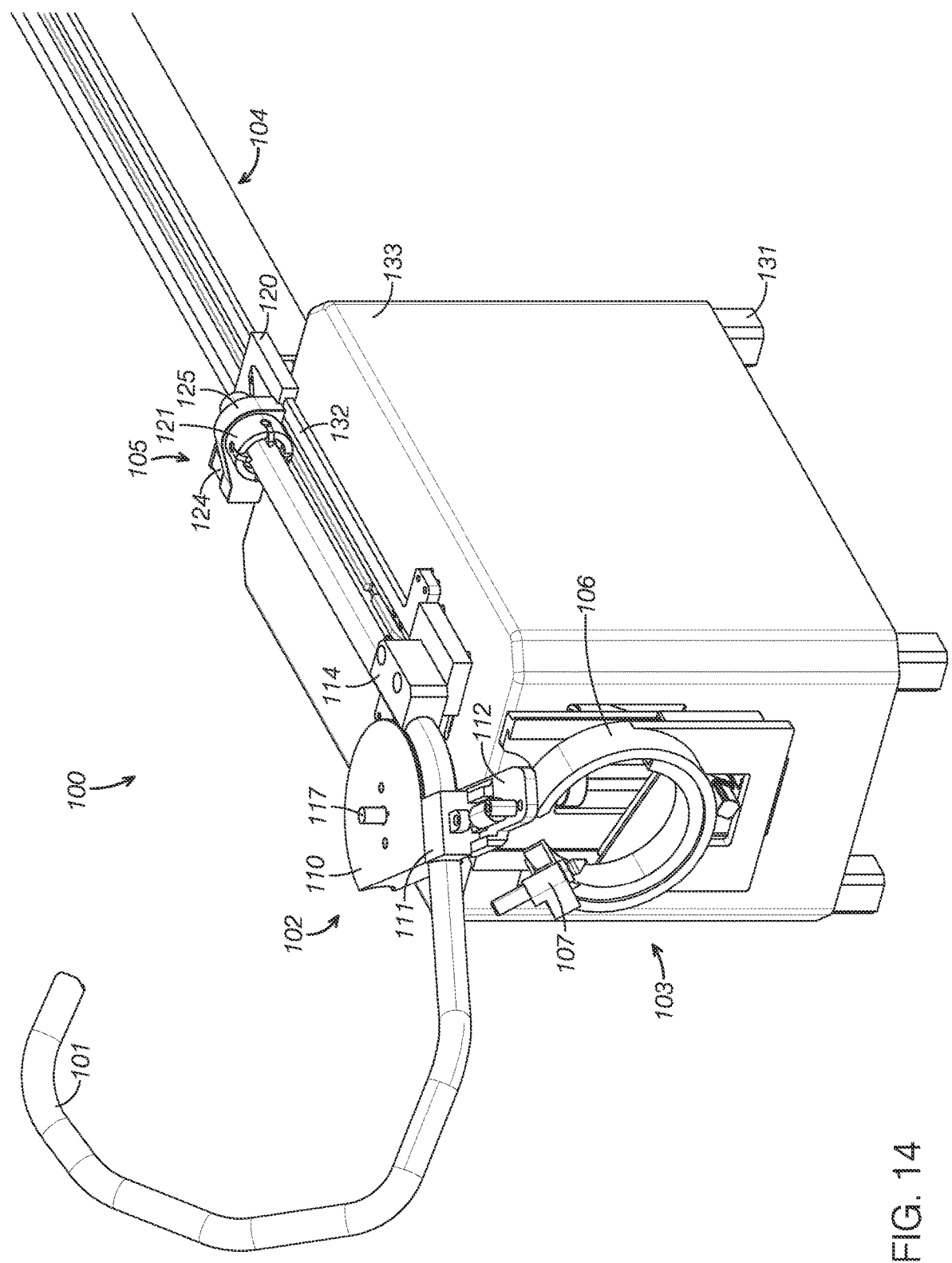
FIG. 14 is perspective view of the tube processing system shown in FIG. 1 in a third step of a processing sequence.
Figure 15:
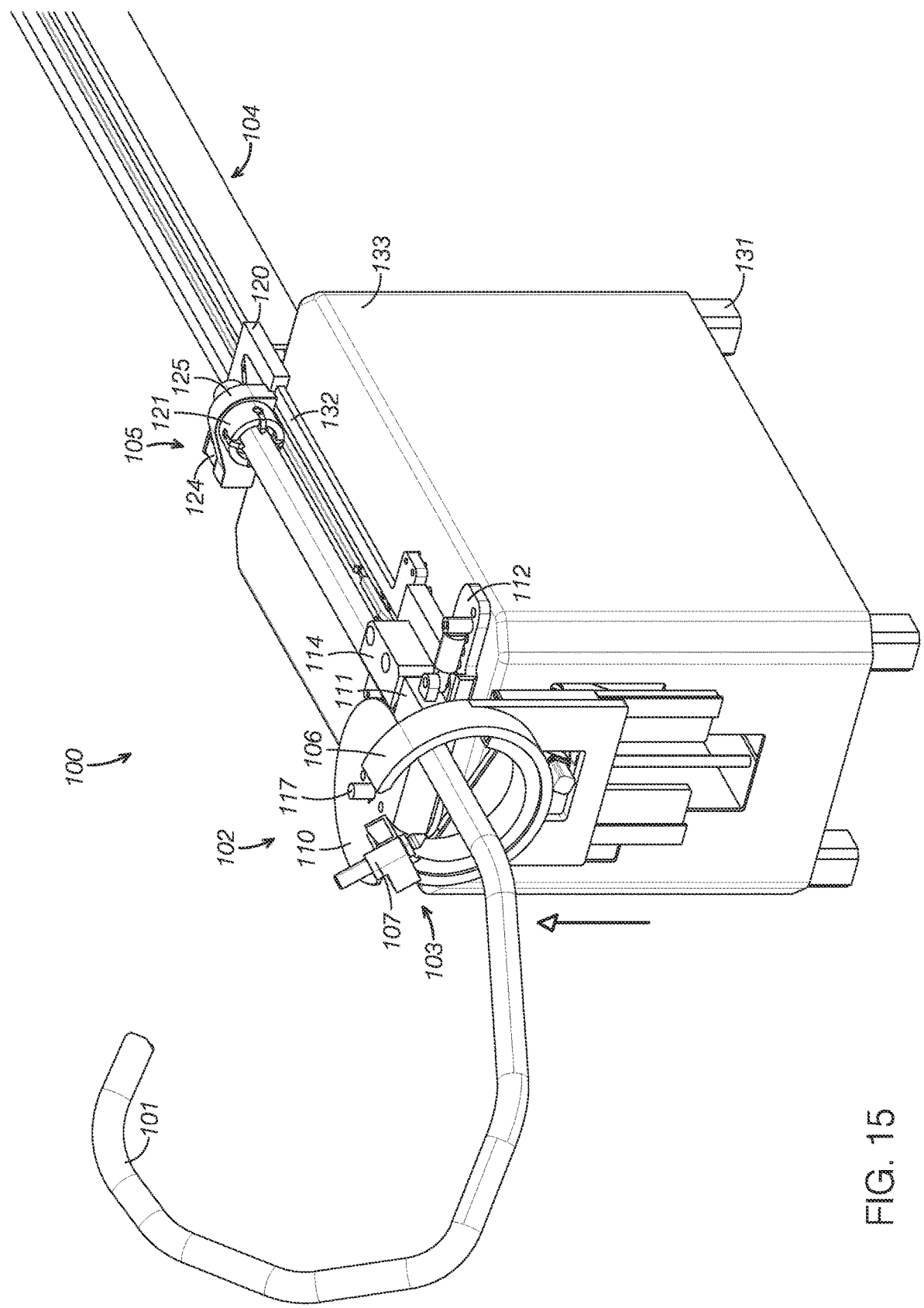
FIG. 15 is perspective view of the tube processing system shown in FIG. 1 in a fourth step of a processing sequence.
Figure 16:
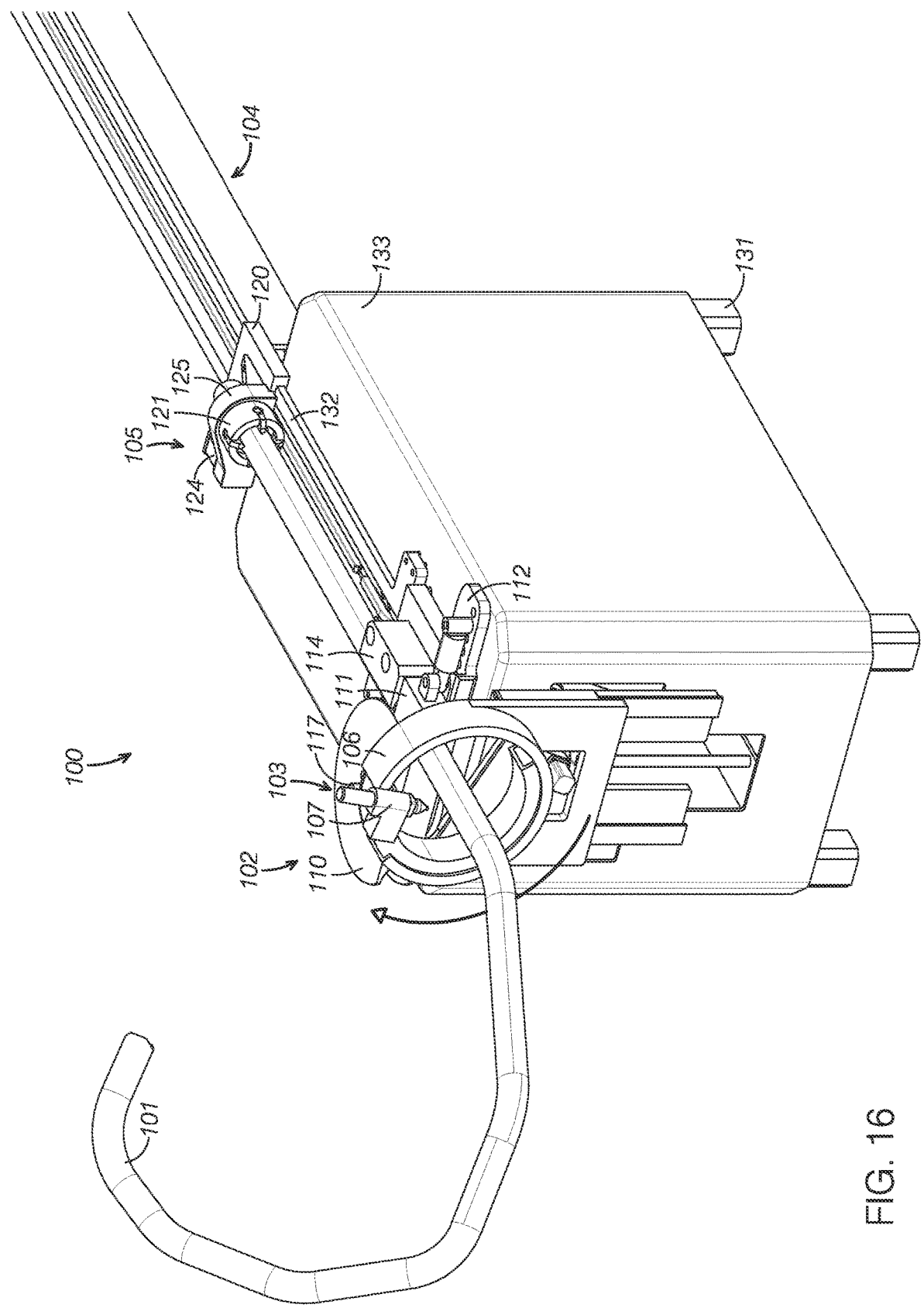
FIG. 16 is perspective view of the tube processing system shown in FIG. 1 in a fifth step of a processing sequence.

With reference to FIGS. 12-14, the reader can see that tray 112 and clamp 111 move in turn with die 110. As shown in FIGS. 12-14, tray 112 and clamp 111 move over notching system 103 when die 110 rotates and positioning system 106 is in a lower stowed position. Positioning system 106 being configured to move between a deployed position and a stowed position is explained in more detail below in the positioning system section.

The die and clamp may be any currently known or later developed type of die and clamp suitable for bending tubes. The size and shape of the die and clamp may be selected to suit the needs of a given application and are not limited to the size and shape of the die and clamp depicted in the figures.

With reference to FIGS. 1-5, 7, and 9-16, feed system 105 moves tube 101 axially to positions tube 101 proximate to die 110 at the longitudinal position on tube 101 where a bend is desired to be formed. Feed system 105 is further configured to rotate tube 101 about its longitudinal axis to enable die 110 to bend tube 101 at a desired tilt angle. The extent to which rotation assembly 113 rotates die 110 determines how much system 100 bends tube 101.

As can be seen in FIGS. 12-16, tray 112 is pivotally mounted to support system 104 and pivots as die 110 rotates. Clamp 111 is mounted on tray 112 and tray 112 pivoting in turn with die 110 as die 110 rotates facilitates clamp 111 securing tube 101 to die 110.

In the present example, as shown in FIGS. 1-6, rotation assembly 113 includes a motor 115 and a drive linkage (contained within an optional cover 116). The drive linkage is configured to rotate a shaft 117 on which die 110 is mounted. Motor 115 driving the drive linkage causes the shaft on which die 110 is mounted to rotate, which in turn causes die 110 to rotate. The user may control the degree to which die 110 rotates, to bend tube 101 by a desired amount, by controlling motor 115.

The motor and drive linkage may be any currently known or later developed type of motor and drive linkage. Their size and shape may be selected to suit the needs of a given application and are not limited to their size and shape depicted in the figures.

Notching System

Notching system 103 functions to form notches and make other cuts in tube 101 in desired cut locations on tube 101. In the example shown in FIGS. 1-16, notching system 103 includes a positioning system 106 and a cutting head 107. Positioning system 106 and cutting head 107 are described in the sections below.

Cutting Head

With reference to FIGS. 1-16 and 18, cutting head 107 serves to form notches or cuts in tube 101. In the example shown in FIGS. 1-16 and 18, cutting head 107 is a carbon dioxide laser cutter. In some examples, the cutting head is a fiber laser cutter. However, the cutting head may be other types of tube cutting devices beyond laser cutters, such as plasma cutters, waterjets, rotating cutting blades, and abrasive cutters. The cutting head may be any currently known or later developed device or system for cutting tubes.

Figure 18:
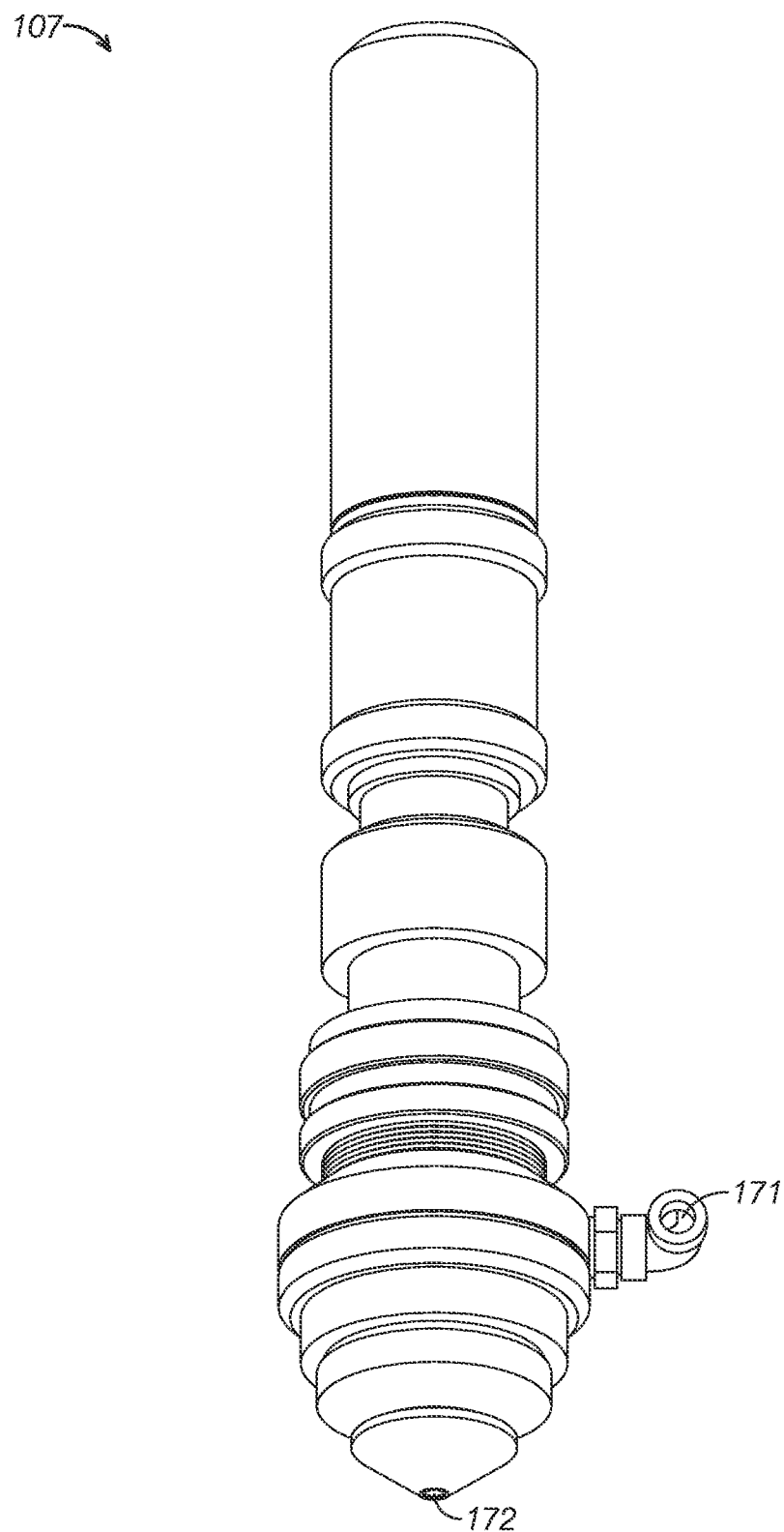
FIG. 18 is a perspective view of a cutting head.

As shown in FIG. 18, cutting head 107 includes a gas inlet 171 and a laser emitter 172. Gas inlet 171 receives a supply of carbon dioxide gas (not pictured), which is excited within cutting head 107 to produce a laser light. The laser light is selectively emitted out of laser emitter 172 to cut notches in tube 101.

Positioning System

Positioning system 106 functions to position cutting head 107 relative to tube 101 in a position to form a notch or cut in tube 101 at a desired cut location on tube 101. The reader can see in FIGS. 5, 16, and 17 that positioning system 106 is configured to move cutting head 107 circumferentially around tube 102 360 degrees or more around tube 101.

Positioning system 106 and feed system 105 cooperate to position cutting head 107 at a desired cut location relative to tube 101. Feed system 105 moves tube 101 axially relative to cutting head 107 to a position where cutting head 107 axially aligns with the desired cut location. Positioning system 106 moves cutting head 107 around tube 101 to overlie the desired cut location. The axial and circumferential positioning of tube 101 and cutting head 107 enable cutting head 107 to be positioned to cut tube 101 at the desired cut location.

Feed system 105 and positioning system 106 may also cooperate to move tube 101 and cutting head 107 in tandem to make curved cuts with cutting head 107. Positioning system 106 moves cutting head 107 around tube 101 to make circumferential cuts while feed system 105 moves tube 101 axially or longitudinally to make axial cuts. Positioning system 106 and feed system 105 may operate concurrently to make curved notches or cuts on tube 101. In some examples, the positioning system moves the cutting head both circumferentially and axially to make curved notches without axial movement of the tube by a feed system. In certain examples, the feed system moves the tube axially and rotates the tube as well to allow the cutting head to make curved notches in the tube.

Figure 17:
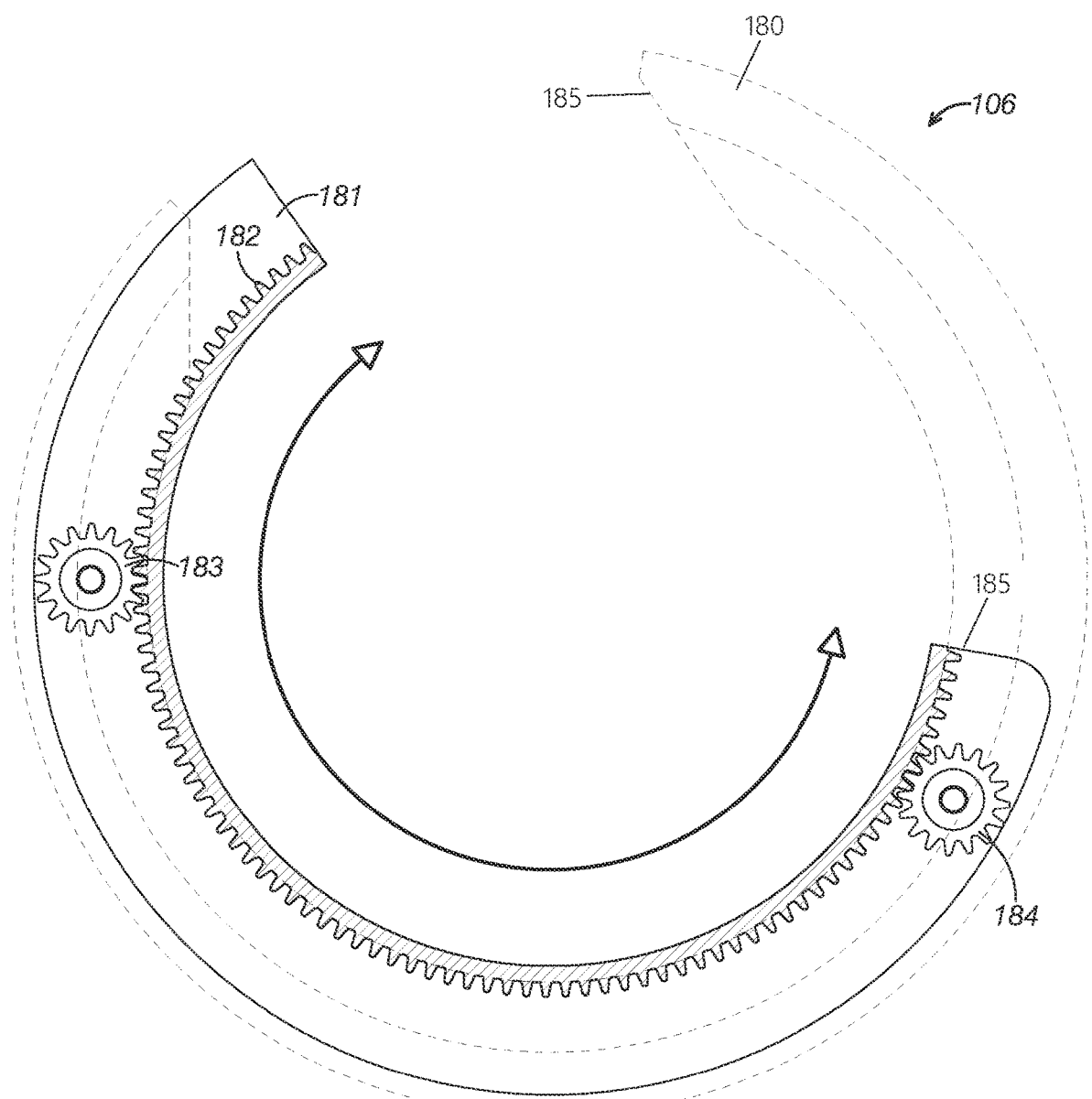
FIG. 17 is a front elevation view of a positioning system with internal components depicted.

With reference to FIG. 17, the reader can see that positioning system 106 includes a cover 180, a partial circle gear 181, a first circumferential gear 183, and a second circumferential gear 184. Partial circle gear 181 resides within cover 180. Cover 180 is optional and not present in all examples.

Partial circle gear 181 defines outer circumferential teeth 182 (not pictured in all figures) that engage corresponding gear teeth in first circumferential gear 183 and second circumferential gear 184. First circumferential gear 183 and second circumferential gear 184 are configured to drive partial circle gear 181 circumferentially. Expressed another way, first circumferential gear 183 and second circumferential gear 184 rotate partial circle gear 181 around tube 101 when tube 101 is disposed within positioning system 106.

In the example shown in FIG. 17, first circumferential gear 183 and second circumferential gear 184 are spaced approximately 220 degrees apart. The spacing is selected to drive partial circle gear 181 over a wide (at least 360 degree) range. In other examples, the circumferential gears are spaced closer or farther apart than depicted in FIG. 17.

As shown in FIG. 17, partial circle gear 181 defines a first circumferential opening 185 and cover 180 defines a second circumferential opening 186. First circumferential opening 185 and second circumferential opening 186 provide space through which tube 101 may pass between terminal ends of partial circle gear 181 and cover 180, respectively, when positioning system raises and lowers as described below. The circumferential openings are complementarily configured with tube 101 to allow partial circle gear 181 and cover 180 to move past tube 101 without contacting tube 101 when positioning system 106 translates transverse to a longitudinal axis of tube 101.

By comparing FIGS. 1-11 and 12-16, the reader can see that positioning system 106 is configured to be raised and lowered relative to support system 104. From another frame of reference, notching system 103 is configured to translate positioning system 106 transverse to a longitudinal axis of tube 101. In particular, notching system 103 translates positioning system 106 between a stowed position spaced from the tube (shown in FIGS. 12-14) and a deployed position where partial circle gear 181 encircles tube 101 (shown in FIGS. 1-11, 15, and 16). In some examples, the notching system is configured to pivot or rotate the positioning system between the stowed position and the deployed position.

Notching system 103 lowering positioning system 106 into the stowed position moves positioning system 106 and cutting head 107 out of the way while bending system 102 bends tube 101. The reader can see in FIGS. 12-14 positioning system 106 and cutting head 107 are spaced from bending system 102 throughout a full range of motion of bending system 102. Raising positioning system 106 to the deployed position brings cutting head 107 proximate to tube 101 supported on support system 104 to form a notch in tube 101.

Support System

Support system 104 functions to support tube 101 as tube 101 is bent and notched. Support system 104 also functions to support bending system 102, notching system 103, and feed system 105.

In the present example, as shown in FIGS. 1-16, support system includes a frame 130, legs 131, a rail 132, and an optional cover 133. A wide variety of alternative support system designs are contemplated, such as tables, benches, and wall mounted shelves. The support system may be any currently known or later developed type of structure suitable for supporting tube bending devices, tube cutting devices, and tubes. The size and shape of the support system may be varied from the size and shape of support system 104 depicted in the figures.

Feed System

Feed system 105 functions to move tube 101 axially over support system 104 and to rotate tube 101 along its longitudinal axis. Feed system 105 serves to translate and rotate tube 101 to a desired position relative to bending system 102 for bending system 102 to bend tube 101 at a desired location on tube 101. Feed system 105 serves to translate and rotate tube 101 to a desired position relative to notching system 103 for notching system 103 to cut tube 101 at a desired location on tube 101.

Feed system 105 moves tube 101 axially to position tube 101 proximate to die 110 at the longitudinal position on tube 101 where a bend is desired to be formed. Feed system 105 is further configured to rotate tube 101 about its longitudinal axis to enable die 110 to bend tube 101 at a desired tilt angle.

Feed system 105 and positioning system 106 cooperate to move tube 101 in tandem to make curved cuts with cutting head 107. Positioning system 106 moves cutting head 107 around tube 101 to make circumferential cuts while feed system 105 moves tube 101 axially or longitudinally to make axial cuts. Positioning system 106 and feed system 105 may operate concurrently to make curved notches or cuts on tube 101. In some examples, the positioning system moves the cutting head both circumferentially and axially to make curved notches without axial movement of the tube by a feed system. In certain examples, the feed system moves the tube axially and rotates the tube as well to allow the cutting head to make curved notches in the tube.

Figure 2:
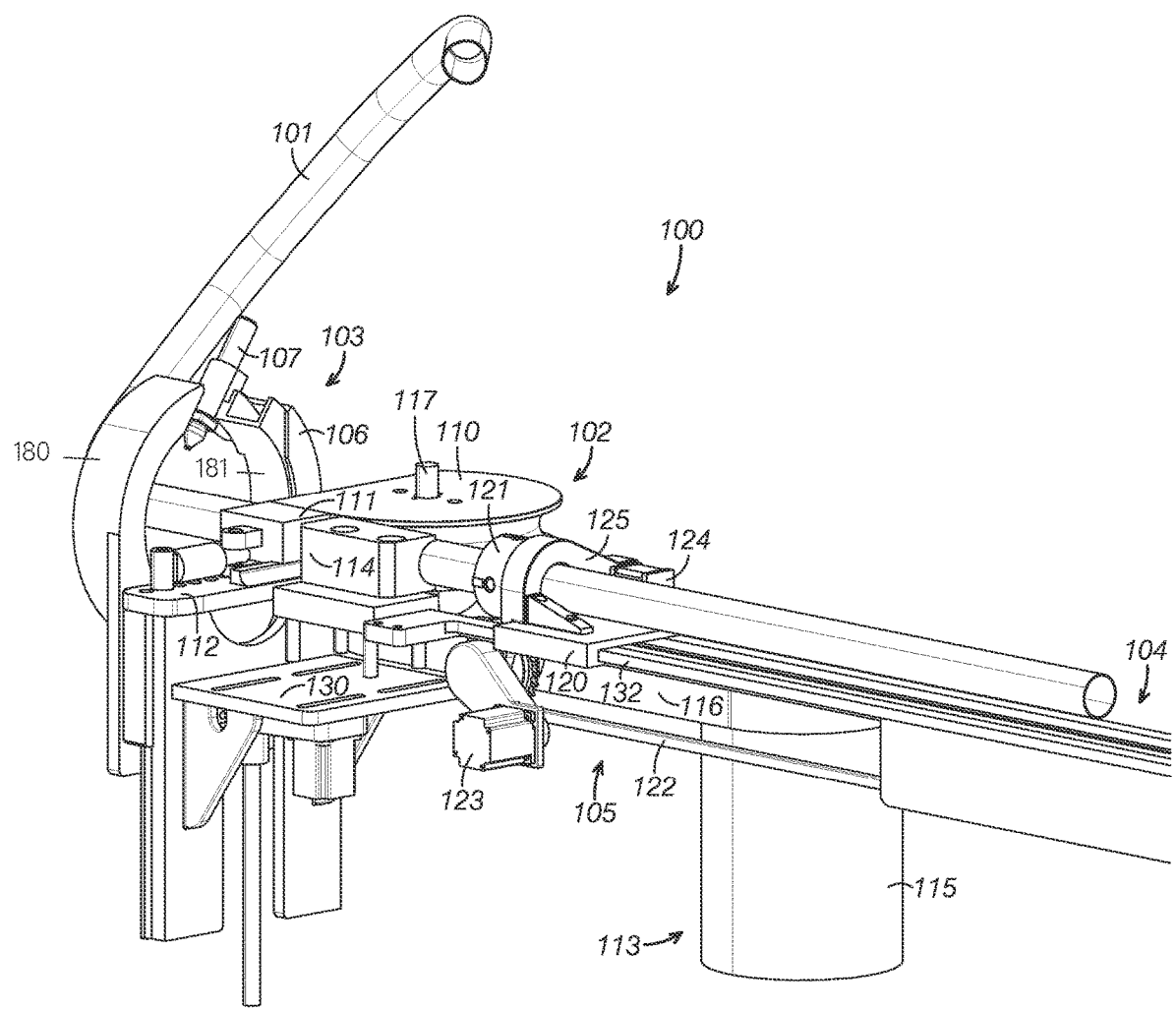
FIG. 2 is rear, left side perspective view of the tube processing system shown in FIG. 1.
Figure 3:
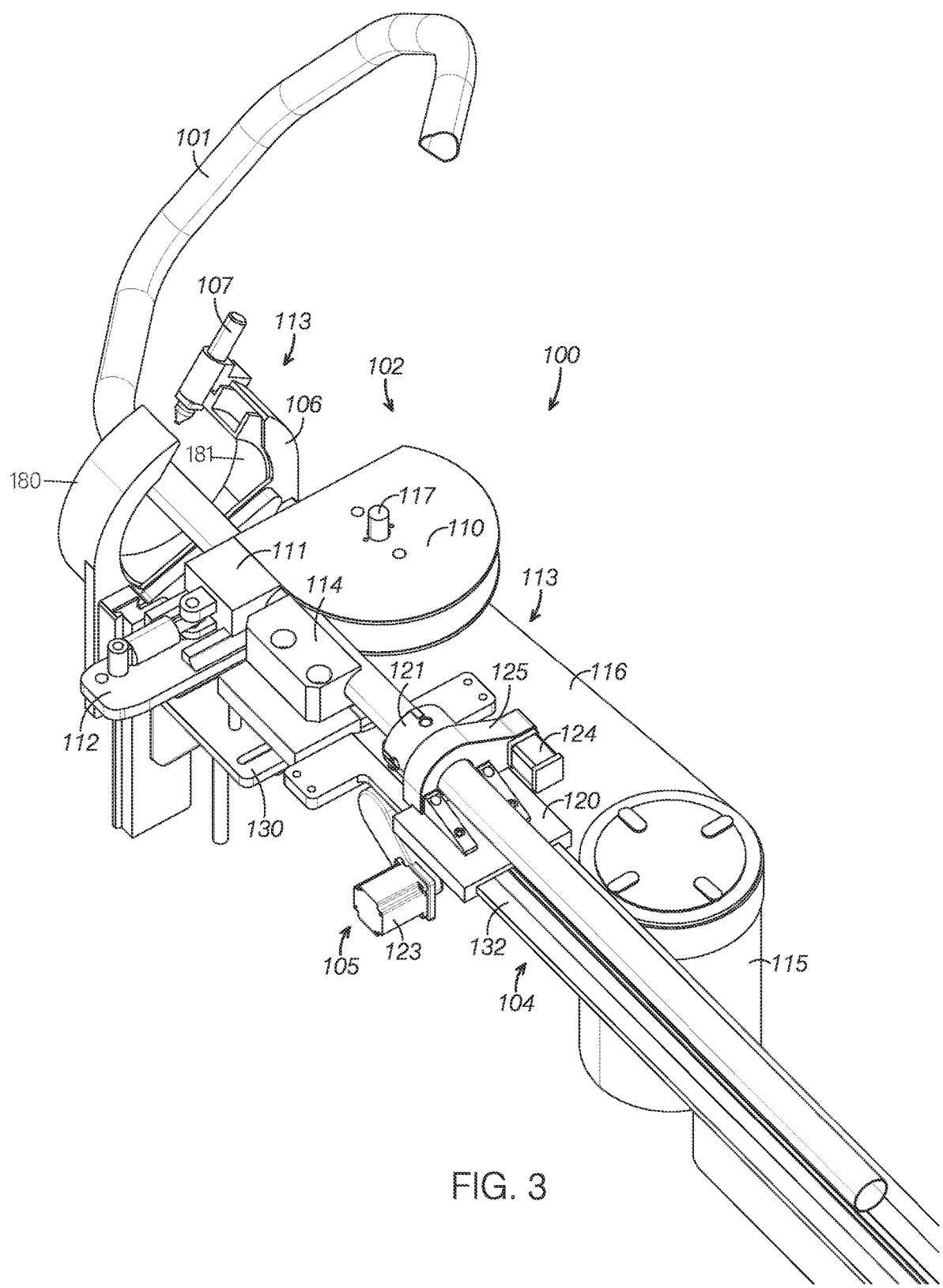
FIG. 3 is top perspective view of the tube processing system shown in FIG. 1.
Figure 4:
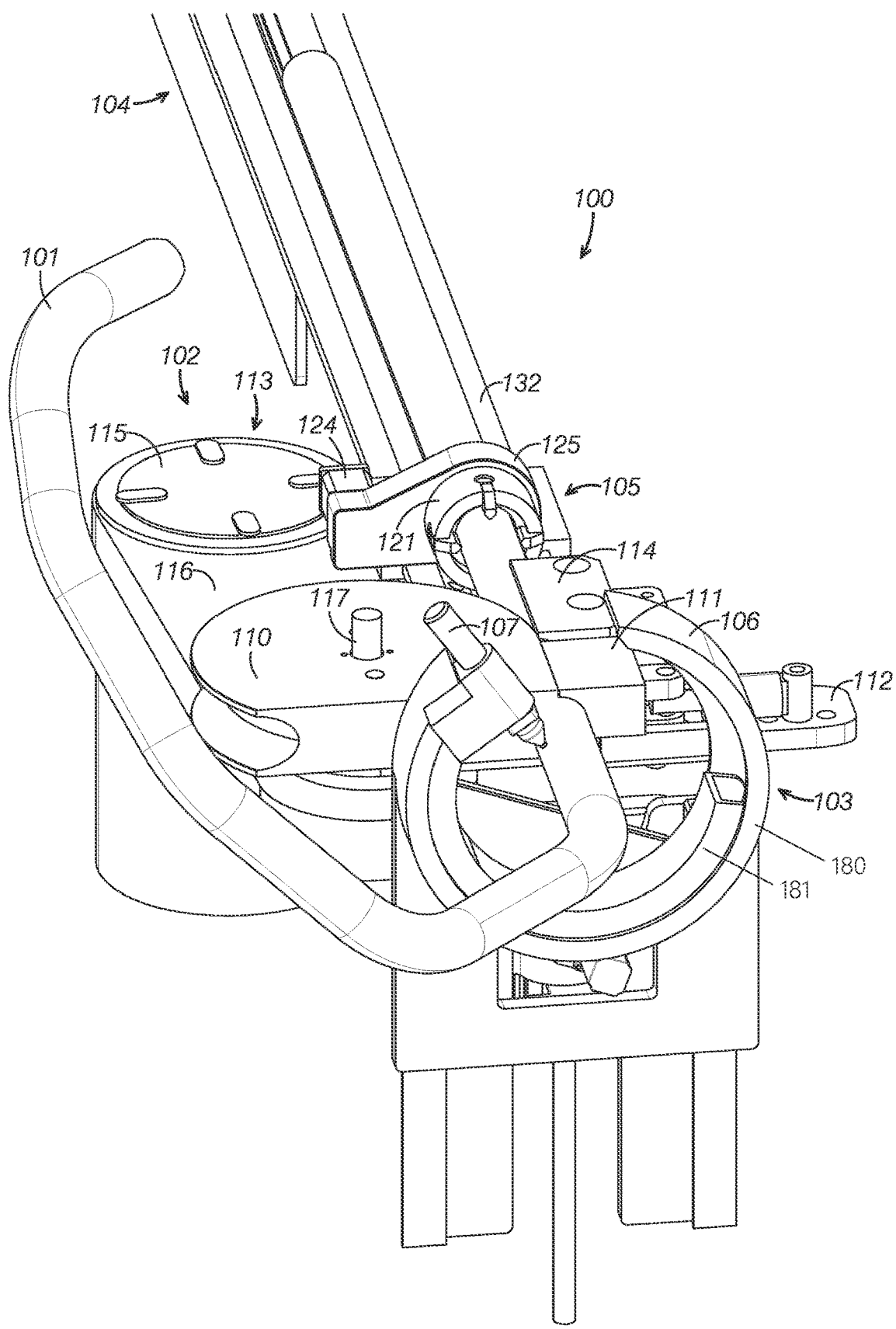
FIG. 4 is front perspective view of the tube processing system shown in FIG. 1.
Figure 5:
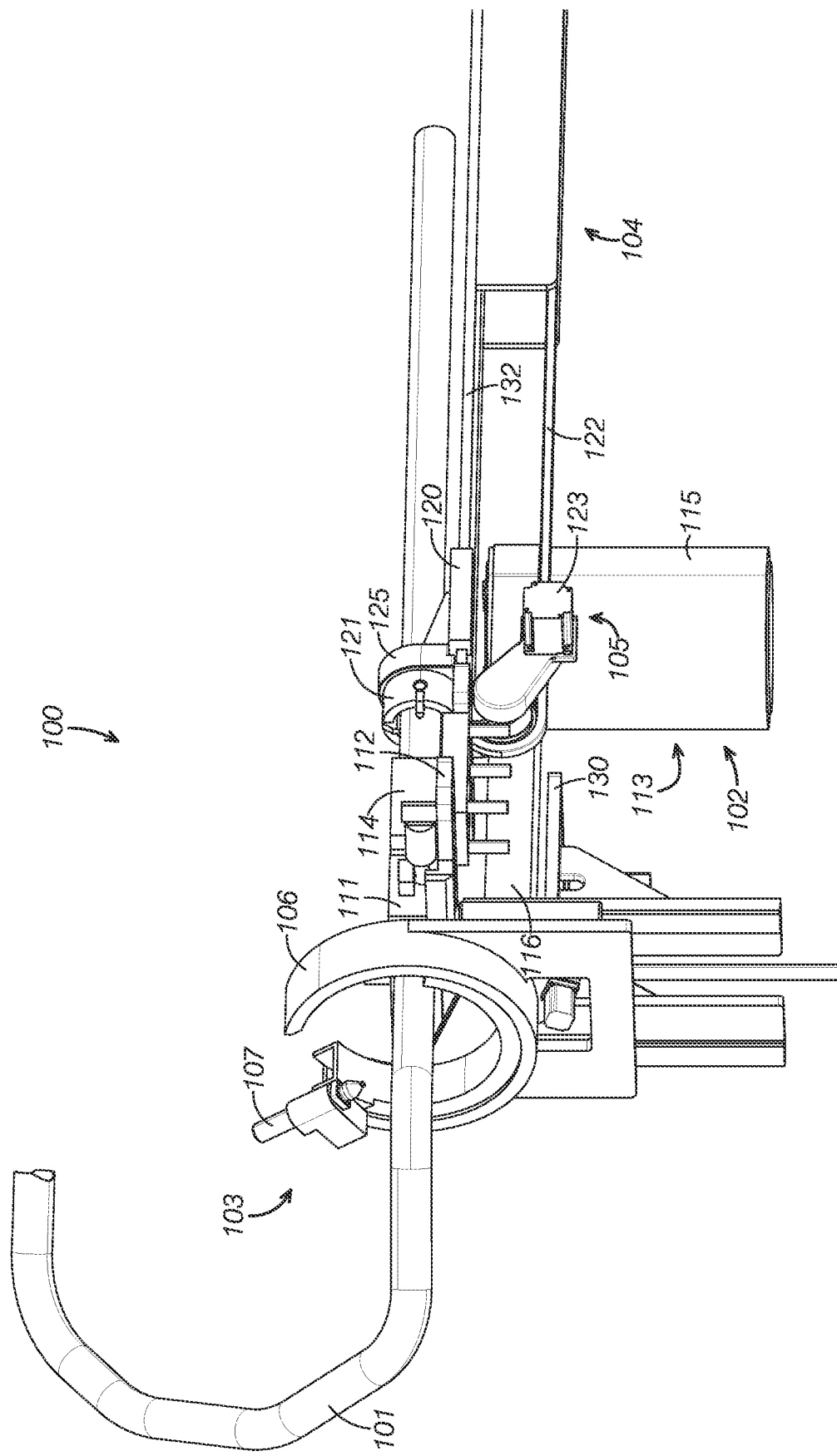
FIG. 5 is front, left side perspective view of the tube processing system shown in FIG. 1.
Figure 6:
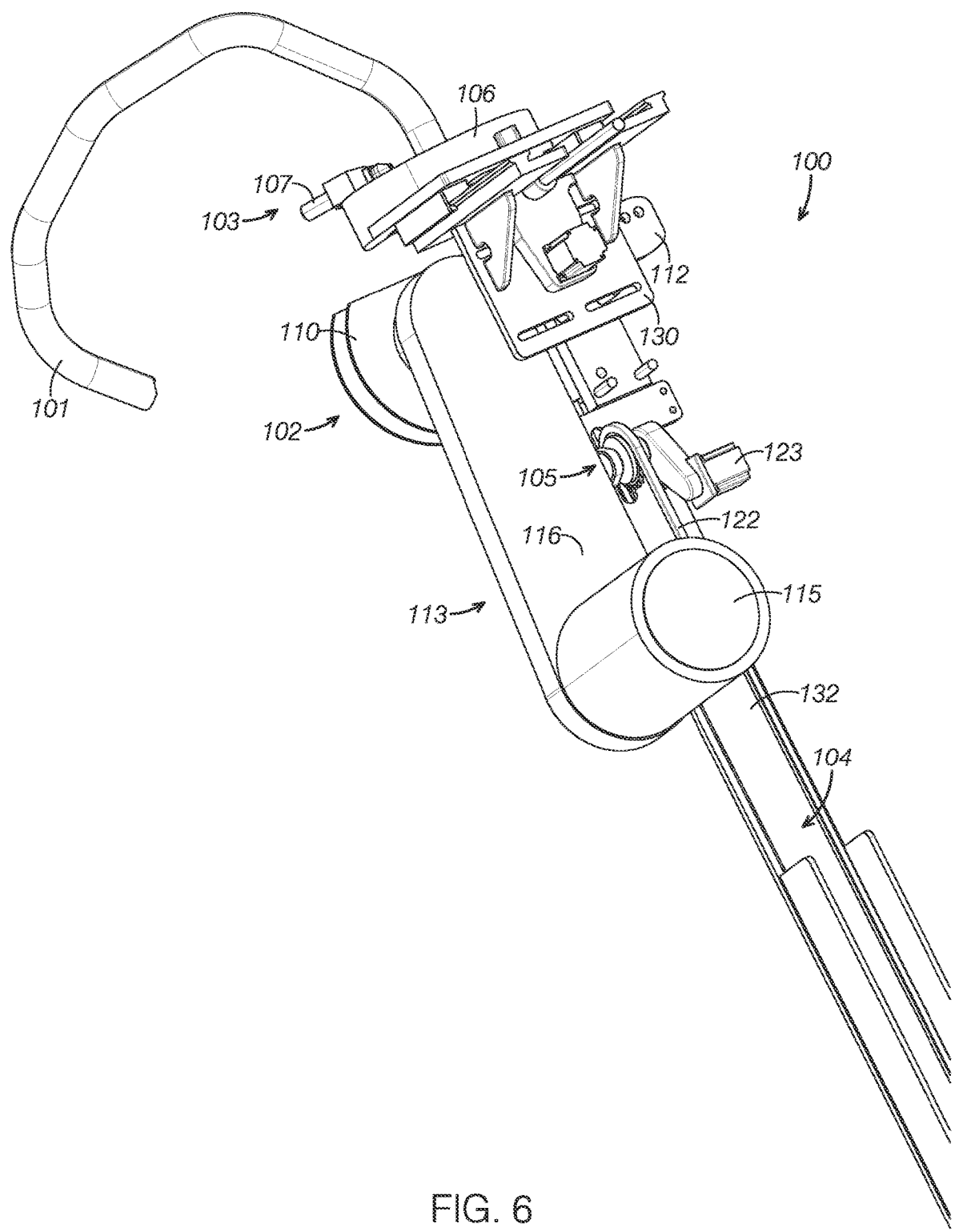
FIG. 6 is bottom perspective view of the tube processing system shown in FIG. 1.
Figure 7:
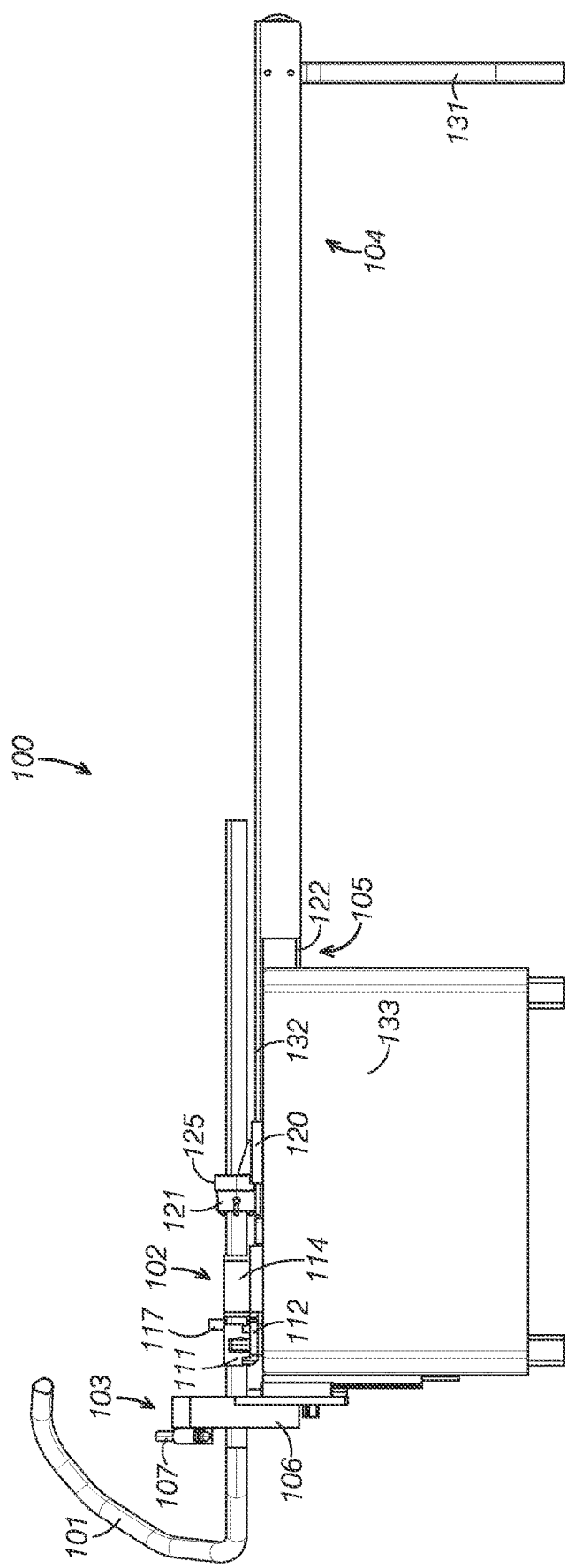
FIG. 7 is left side elevation view of the tube processing system shown in FIG. 1.
Figure 8:
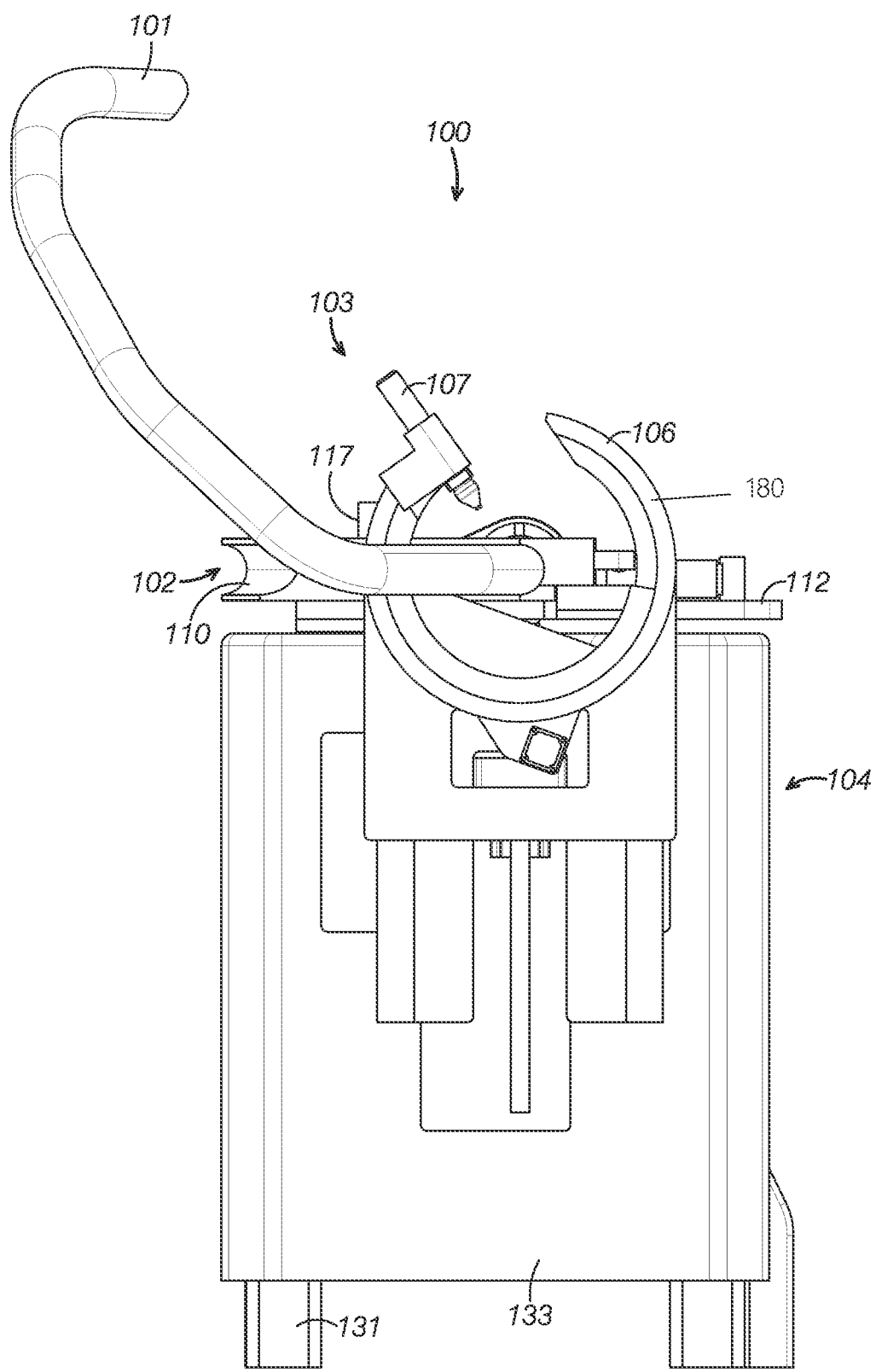
FIG. 8 is front elevation view of the tube processing system shown in FIG. 1.
Figure 9:
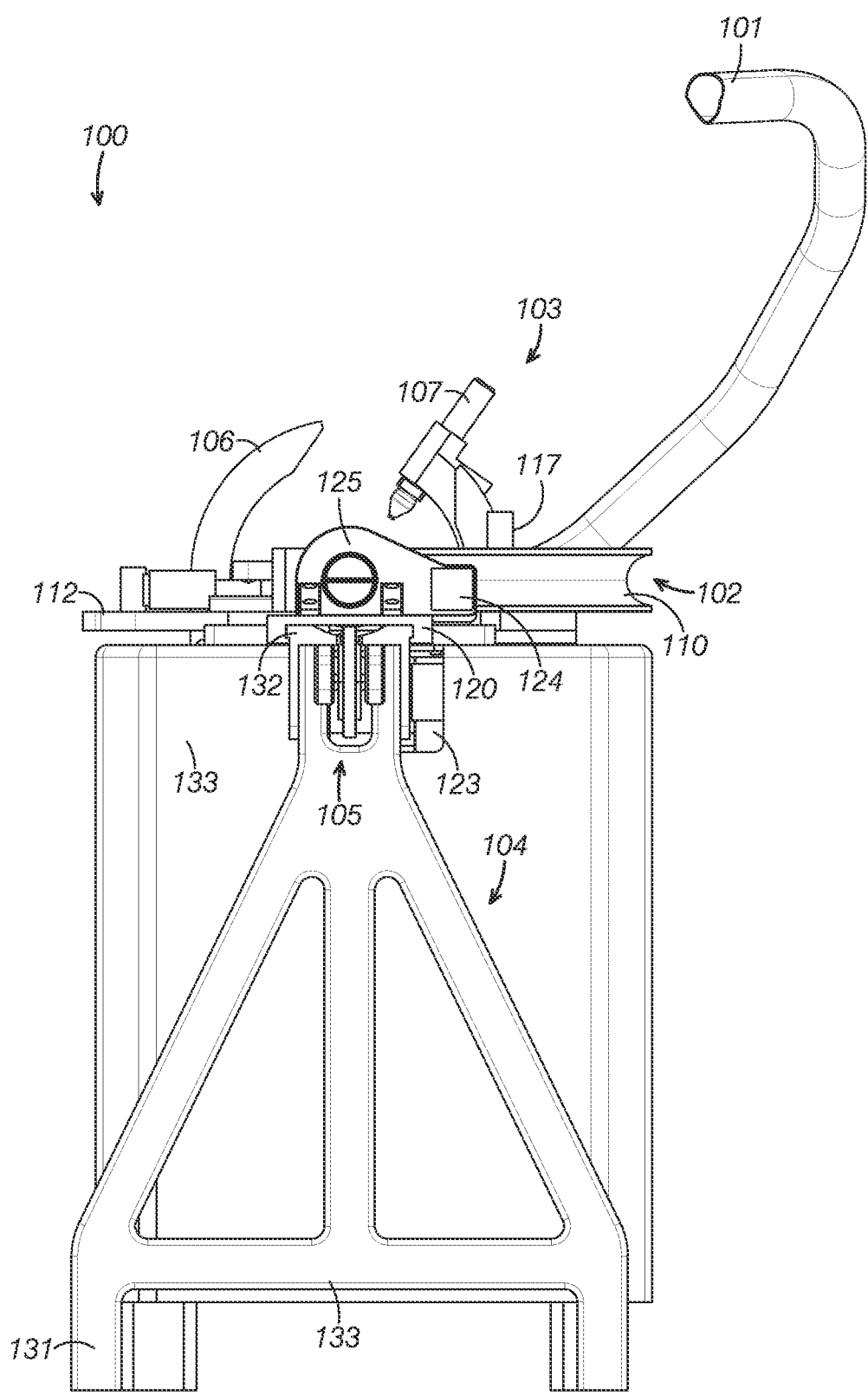
FIG. 9 is rear elevation view of the tube processing system shown in FIG. 1.
Figure 10:
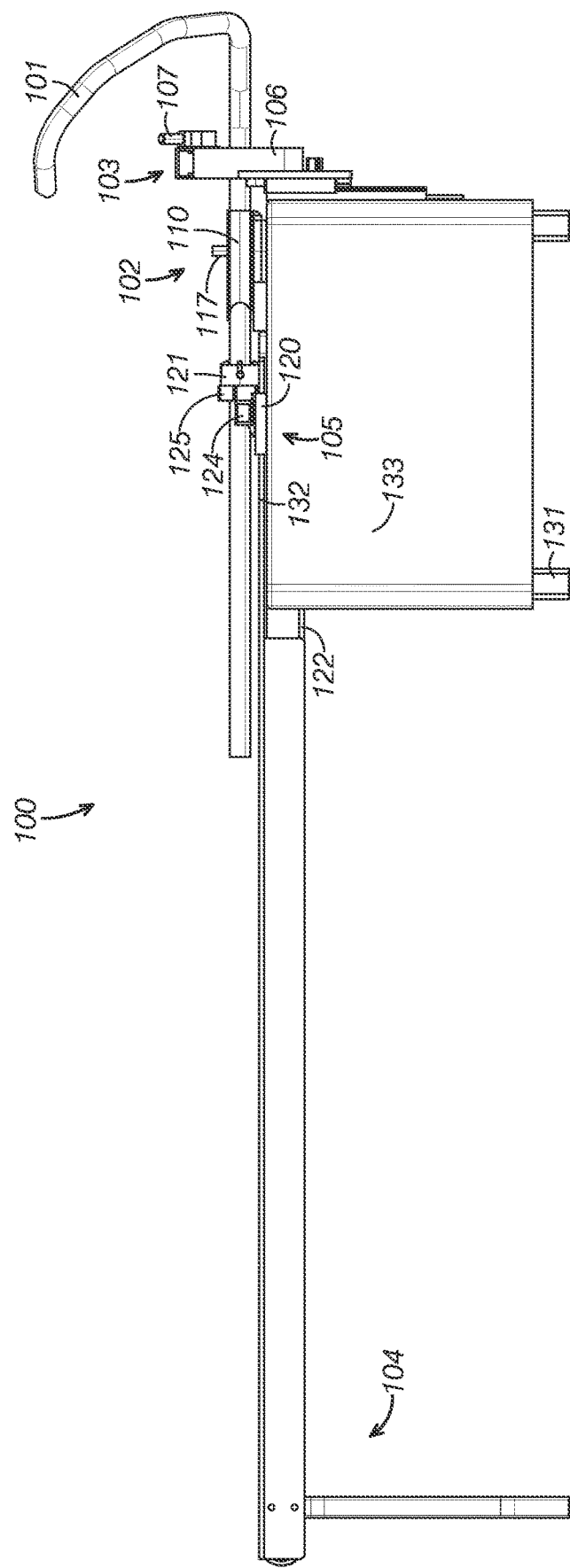
FIG. 10 is right side elevation view of the tube processing system shown in FIG. 1.
Figure 11:
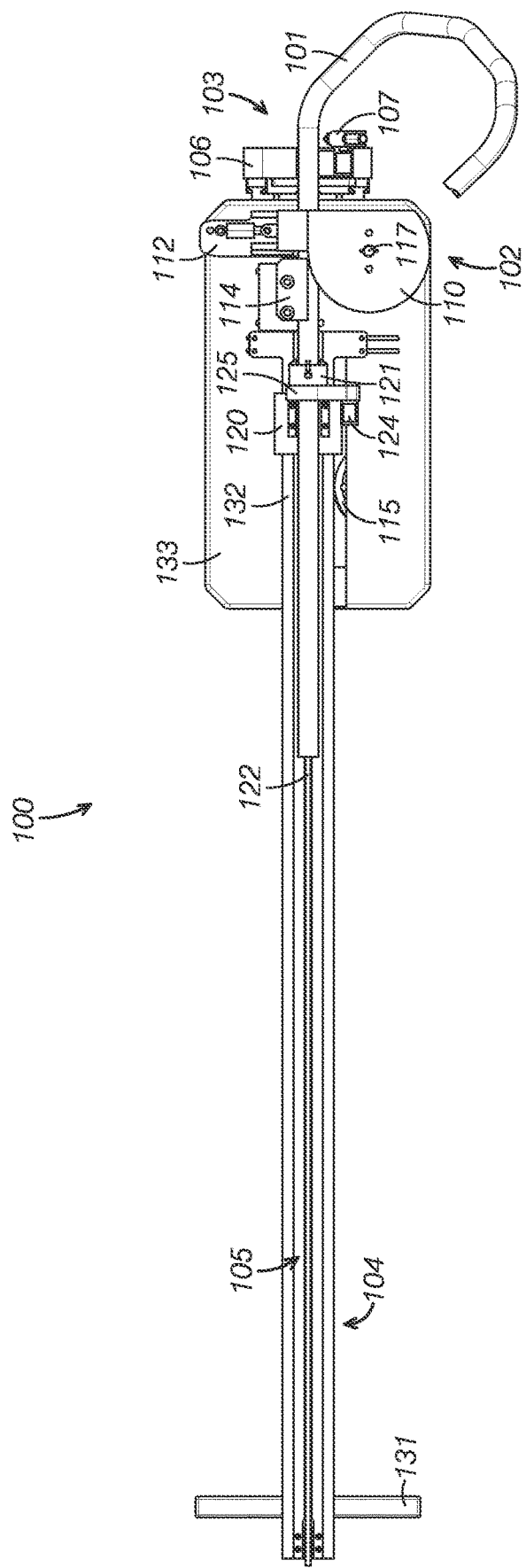
FIG. 11 is top plan view of the tube processing system shown in FIG. 1.

With reference to FIG. 2, the reader can see that feed system 105 includes a sled 120, a collar 121, a drive linkage 122, a translation motor 123, a rotation motor 124, and a tube rotator 125. Sled 120 is movably mounted to rail 132 of support system 104. Collar 121 is mounted to tube rotator 125, which is mounted to sled 120. Collar 121 and tube rotator 125 link tube 101 to sled 120 such that tube 101 translates in turn with sled 120 translating.

Translation motor 123 selectively drives drive linkage 122 and sled 120 is coupled to drive linkage 122. Translation motor 123 thus selectively translates sled 120 and tube 101 linked to sled 120 when translation motor 123 selectively drives drive linkage 122.

Rotation motor 124 selectively drives tube rotator 125. As shown in FIGS. 1-14, tube rotator 125 circumferentially engages tube 101 and is mounted to sled 120. Tube rotator 125 is configured to rotate tube 101 when tube rotator 125 is driven by rotation motor 124. Tube rotator 125 includes a belt that drivingly couples to an output shaft of rotation motor 124 and that extends around a portion of the circumference of tube 101. Selectively activating rotation motor 124 enables a user to selectively rotate tube 101 with tube rotator 125 in a clockwise or counterclockwise direction.

In other examples, the feed system is configured differently. For example, the feed system may additionally or alternatively include linear actuators, screw drives, conveyor belts, or magnetically driven shuttles. In some examples, the feed system is configured to rotate the tube as well as move it axially.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A tube processing system for bending and notching a tube fed from a feed position, comprising:
    a notching system configured to cut a notch in the tube; and
    a bending system disposed between the notching system and the feed position and configured to bend the tube;
    a feed system configured to translate the tube longitudinally to the notching system and to the bending system and configured to rotate the tube about a longitudinal axis of the tube;
    wherein the notching system includes:
        a cutting head configured to cut a notch in the tube; and
        a positioning system movably supporting the cutting head and configured to move the cutting head relative to the tube to a selected cutting position;
    wherein the bending system includes:
        a bending die that is rotationally driven to bend the tube; and
        a clamp configured to secure the tube to the bending die.

2. The tube processing system of claim 1, wherein the feed system includes:
    a translation motor;
    a drive linkage driven by the translation motor; and
    a sled coupled to the drive linkage and operatively coupled to the tube.

3. The tube processing system of claim 2, wherein the feed system includes a feed clamp coupled to the sled and selectively coupled to the tube.

4. The tube processing system of claim 2, wherein the feed system includes:
    a rotation motor; and
    a tube rotator driven to rotate by the rotation motor and circumferentially coupled to the tube to rotate the tube when driven by the rotation motor.

5. The tube processing system of claim 4, wherein the rotation motor is configured to drive the tube rotator to rotate both clockwise and counterclockwise.

6. The tube processing system of claim 1, wherein the cutting head includes a laser emitter.

7. The tube processing system of claim 6, wherein the laser emitter includes a supply of carbon dioxide configured to be selectively excited with an electric current.

8. A tube processing system for bending and notching a tube fed from a feed position, comprising:
    a notching system configured to cut a notch in the tube; and
    a bending system disposed between the notching system and the feed position and configured to bend the tube;
    wherein the notching system includes:
        a cutting head configured to cut a notch in the tube; and
        a positioning system movably supporting the cutting head and configured to move the cutting head circumferentially around the tube to a selected cutting position;
    wherein the bending system includes:
        a bending die that is rotationally driven to bend the tube; and
        a clamp configured to secure the tube to the bending die.

9. The tube processing system of claim 8, wherein the positioning system is configured to move the cutting head circumferentially at least 360 degrees around the tube.

10. The tube processing system of claim 8, wherein the notching system is configured to translate the positioning system transverse to a longitudinal axis of the tube.

11. The tube processing system of claim 10, wherein the positioning system includes a partial circle gear defining a circumferential opening.

12. The tube processing system of claim 11, wherein:
    the partial circle gear defines outer circumferential teeth; and
    the positioning system includes a circumferential gear drivingly engaged with the outer circumferential teeth.

13. The tube processing system of claim 10, wherein the circumferential opening is complementarily configured with the tube to allow the partial circle gear to move past the tube without contacting the tube when the positioning system translates transverse to a longitudinal axis of the tube.

14. The tube processing system of claim 13, wherein the notching system is configured to translate the positioning system between a stowed position spaced from the tube and a deployed position where the partial circle gear encircles the tube.

15. The tube processing system of claim 14, wherein in the stowed position the positioning system and the cutting head are spaced from the bending system throughout a full range of motion of the bending system.

16. The tube processing system of claim 8, wherein:
    the tube processing system further comprises a feed system configured to translate the tube longitudinally; and
    the feed system and the positioning system cooperate to concurrently translate the tube longitudinally while moving the cutting head circumferentially around the tube to cut curved notches in the tube.

17. A tube processing system for bending and notching a tube fed from a feed position, comprising:
    a notching system configured to cut a notch in the tube; and
    a bending system disposed between the notching system and the feed position and configured to bend the tube;
    wherein the notching system includes:
        a cutting head configured to cut a notch in the tube; and
        a positioning system movably supporting the cutting head and configured to move the cutting head relative to the tube to a selected cutting position;

wherein the bending system includes:
a bending die that is rotationally driven to bend the tube; and
a clamp configured to secure the tube to the bending die wherein:
the bending system includes a tray supporting the clamp and coupled to the bending die to move the tray and the clamp in turn with the bending die as the bending die rotates;
the notching system is configured to translate the positioning system between a stowed position and deployed position; and
the tray moves over the notching system when the bending die rotates and the positioning system is in the stowed position.

* * * * *